United States Patent
Salmon et al.

(10) Patent No.: US 7,740,674 B2
(45) Date of Patent: Jun. 22, 2010

(54) HIGH-PRESSURE SEPARATOR

(75) Inventors: Bailey James Salmon, Longview, TX (US); Wayne Scott Strasser, Kingsport, TN (US); Kenneth Alan Dooley, Longview, TX (US); Justin Dean Hearron, Hallsville, TX (US); Mark Dwayne Lorenz, Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 7 days.

(21) Appl. No.: 11/998,414

(22) Filed: Nov. 30, 2007

(65) Prior Publication Data

US 2008/0177019 A1  Jul. 24, 2008

Related U.S. Application Data

(60) Provisional application No. 60/861,727, filed on Nov. 30, 2006.

(51) Int. Cl.
*B01D 50/00* (2006.01)
(52) U.S. Cl. .............................. 55/319; 55/318; 55/337; 55/447; 55/461
(58) Field of Classification Search ........... 55/318–319, 55/337, 447–461
See application file for complete search history.

(56) References Cited

U.S. PATENT DOCUMENTS

| 3,523,408 | A | * | 8/1970 | Rosenberg | ........................ | 96/6 |
|---|---|---|---|---|---|---|
| 3,917,473 | A | | 11/1975 | Fournie | | |
| 4,015,960 | A | * | 4/1977 | Nutter | ......................... | 55/355 |
| 4,056,371 | A | | 11/1977 | Diemer | | |
| 4,289,512 | A | | 9/1981 | Levresse | | |
| 4,516,994 | A | * | 5/1985 | Kocher | ......................... | 55/337 |
| 4,668,473 | A | * | 5/1987 | Agarwal | ...................... | 422/62 |
| 4,795,854 | A | | 1/1989 | Levresse | | |
| 5,586,998 | A | | 12/1996 | Gauthier | | |
| 5,824,135 | A | | 10/1998 | Minihan | | |
| 6,200,361 | B1 | * | 3/2001 | Krymsky | ...................... | 55/319 |
| 7,115,157 | B2 | | 10/2006 | Flynn et al. | | |
| 7,488,361 | B2 | * | 2/2009 | Larnholm | ..................... | 55/318 |
| 2003/0106292 | A1 | * | 6/2003 | Kitano et al. | ................. | 55/396 |
| 2006/0123744 | A1 | * | 6/2006 | Read | ........................... | 55/337 |
| 2007/0044437 | A1 | * | 3/2007 | Larnholm et al. | ............. | 55/319 |

FOREIGN PATENT DOCUMENTS

| EP | 87778 A2 * | 9/1983 |
|---|---|---|
| EP | 1 557 218 | 7/2005 |
| GB | 2004208 | 3/1979 |
| JP | 2006061897 | 3/2006 |

OTHER PUBLICATIONS

D.G. Nowell, "A Revised L P Hopper Inlet Based on Observations Made Through Viewing Windows," ICI Polyethylene Group Technical Conference 1979, pp. 1-4 (Mar. 16, 1979).
Letter from A.K. Gardner, ICI Plastics Division, to Jesse Goza, Texas Eastman Company, dated Jul. 23, 1980, pp. 1-3.

* cited by examiner

*Primary Examiner*—Jason M Greene
*Assistant Examiner*—Dung Bui
(74) *Attorney, Agent, or Firm*—Phan Law Group PLLC

(57) ABSTRACT

A high-pressure separator with improved efficiency is provided. The separator comprises a centrifugal separator located inside of a gravity separator. The centrifugal separator has an enclosed upper portion and desirably comprises a single cylinder. The high-pressure separator is particularly suitable for use in the production of low-density polyethylene under high pressure.

12 Claims, 2 Drawing Sheets

HIGH-PRESSURE SEPARATOR

CROSS-REFERENCE TO RELATED APPLICATION

This application claims the benefit of U.S. Provisional Patent Application No. 60/861,727, filed on Nov. 30, 2006; the entire content of which is hereby incorporated by reference.

FIELD OF THE INVENTION

The invention generally relates to an improved high-pressure separator and its use in separating liquids from gases. The separator is particularly useful in combination with high-pressure reactors, such as those used to make low-density polyethylene.

BACKGROUND OF THE INVENTION

In a continuous high-pressure polyolefin polymerization process, polyethylene product and low-molecular weight waxes are dissolved in the carrier ethylene exiting the reactor. As pressures and temperatures are decreased through various pressure letdown and cooling steps, the product and waxes come out of solution resulting in two distinct phases, one gas and one liquid.

The liquids are subsequently separated from the gas via various separation technologies and equipment. One such device, shown in FIG. 1, includes a vertical cylindrical vessel 10 into which the gas/liquid mixture 11 is fed, a trumpet entry 12 which directs the gas/liquid mixture 11 towards the liquid surface 13 where liquid droplets impinge on and adhere to the liquid surface 13. The separated liquid phase exits the vessel 10 through a liquid outlet 14 located at the bottom of the vessel 10, and the separated gas phase exits the vessel through a gas outlet 15 located at the top of the vessel 10. The separation efficiency of such a device is dependent upon the relative densities and viscosities of the gas and liquid components, droplet sizes, throughputs, and the configuration of the vessel 10 and trumpet 12.

The conventional separation devices are not 100% efficient and some product and waxes pass out of the separation vessels, entrained in the ethylene carrier gas. Entrained liquids increase fouling of downstream heat exchangers resulting in more frequent "burn-outs." Entrainment of the liquids into compressors and piping where they potentially solidify lowers plant on-stream factors and operating rates, and increases cleaning and maintenance time and costs. In extreme cases, entrained liquids can cause piping blockages and premature failure of mechanical components.

Thus, there is a need in the art for a high-pressure separator with improved separation efficiency to reduce the amount of liquids passing out of the separator with the gas stream and into downstream processes and equipment.

SUMMARY OF THE INVENTION

In one aspect, the invention provides an apparatus for separating a high-pressure mixture comprising a gas and liquid particles. The apparatus comprises:
  (a) a gravity separator for expanding and separating the mixture into a gas phase and a liquid phase; and
  (b) a centrifugal separator located inside of the gravity separator for imparting a helical flow to the mixture.

The gravity separator comprises a vertical cylindrical shell, an opening for an inlet for the mixture, a gas outlet located in an upper portion of the cylindrical shell, and a liquid outlet located in a lower portion of the cylindrical shell.

The centrifugal separator comprises an inlet for the mixture located in an upper portion of the centrifugal separator, an enclosed upper portion except for the inlet, and an outlet for the mixture located at a lower portion of the centrifugal separator.

In another aspect, the invention provides a method for separating a high-pressure mixture comprising a gas and liquid particles. The method comprises the steps of:
  (a) introducing the mixture into a high-pressure separation apparatus according to the present invention;
  (b) separating the mixture into a gas phase and a liquid phase;
  (c) withdrawing the gas phase out of the gravity separator through the gas outlet located in an upper portion of the cylindrical shell; and
  (d) withdrawing the liquid phase out of the gravity separator through the liquid outlet located in a lower portion of the cylindrical shell.

In yet another aspect, the invention provides an apparatus for preparing low-density polyethylene. The apparatus comprises:
  (a) a reactor for polymerizing ethylene at a pressure of 500 to 3,000 atmospheres (about 50-300 MPa) and a temperature of 160 to 350° C.;
  (b) a pressure reducing device for reducing the pressure of a product stream from the reactor; and
  (c) a high-pressure separation apparatus according to the present invention for separating liquid polyethylene particles and gaseous ethylene in the product stream.

In yet another aspect, the invention provides a method for making low-density polyethylene. The method comprises the steps of:
  (a) polymerizing ethylene in a reactor at a pressure of 500 to 3,000 atmospheres (about 50-300 MPa) and a temperature of 160 to 350° C.;
  (b) passing a product stream comprising liquid polyethylene particles and gaseous ethylene from the reactor to a pressure reducing device to reduce the pressure of the product stream; and
  (c) passing the product stream from the pressure reducing device to a high-pressure separation apparatus according to the present invention to separate the liquid polyethylene particles from the gaseous ethylene.

BRIEF DESCRIPTION OF THE INVENTION

DETAILED DESCRIPTION OF THE INVENTION

The invention will be more readily understood from the following description of embodiments of the high-pressure separating apparatus according to the invention, with particular reference to the accompanying drawing. The embodiments are provided for illustrative purposes and should not be construed to limit the invention.

Figure 1:
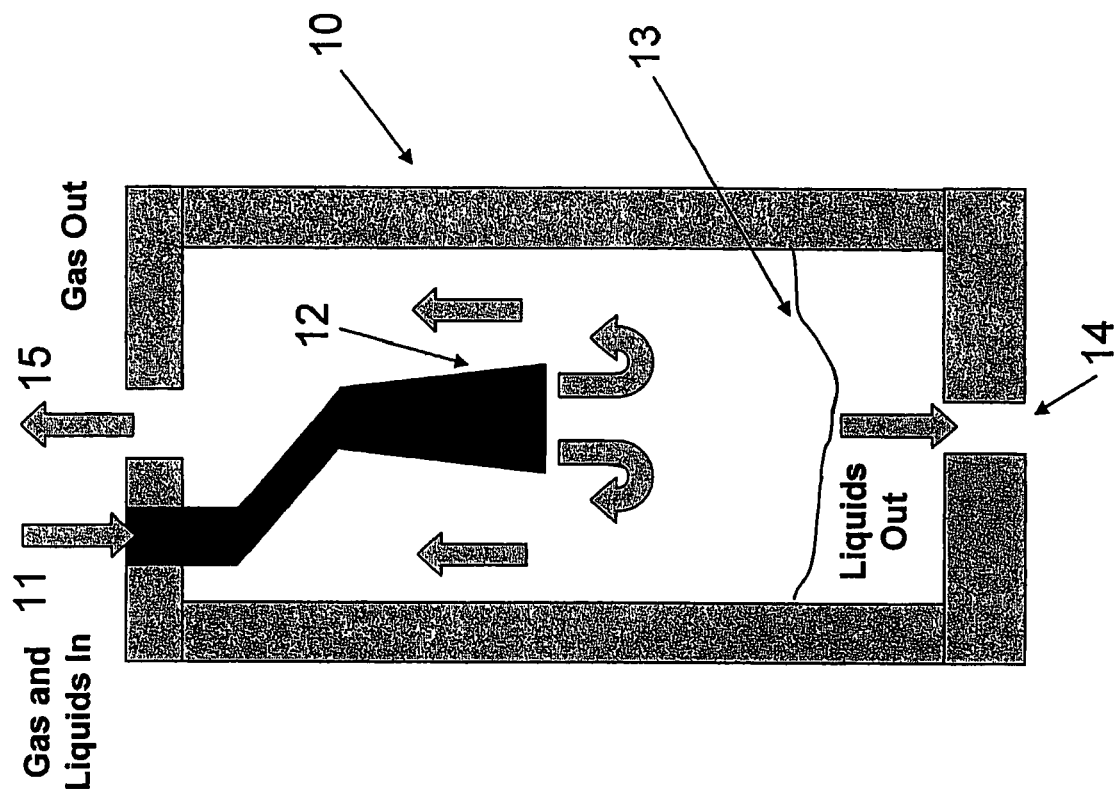
FIG. 1 is a cross-sectional view of a typical high-pressure separator now in use.
Figure 2:
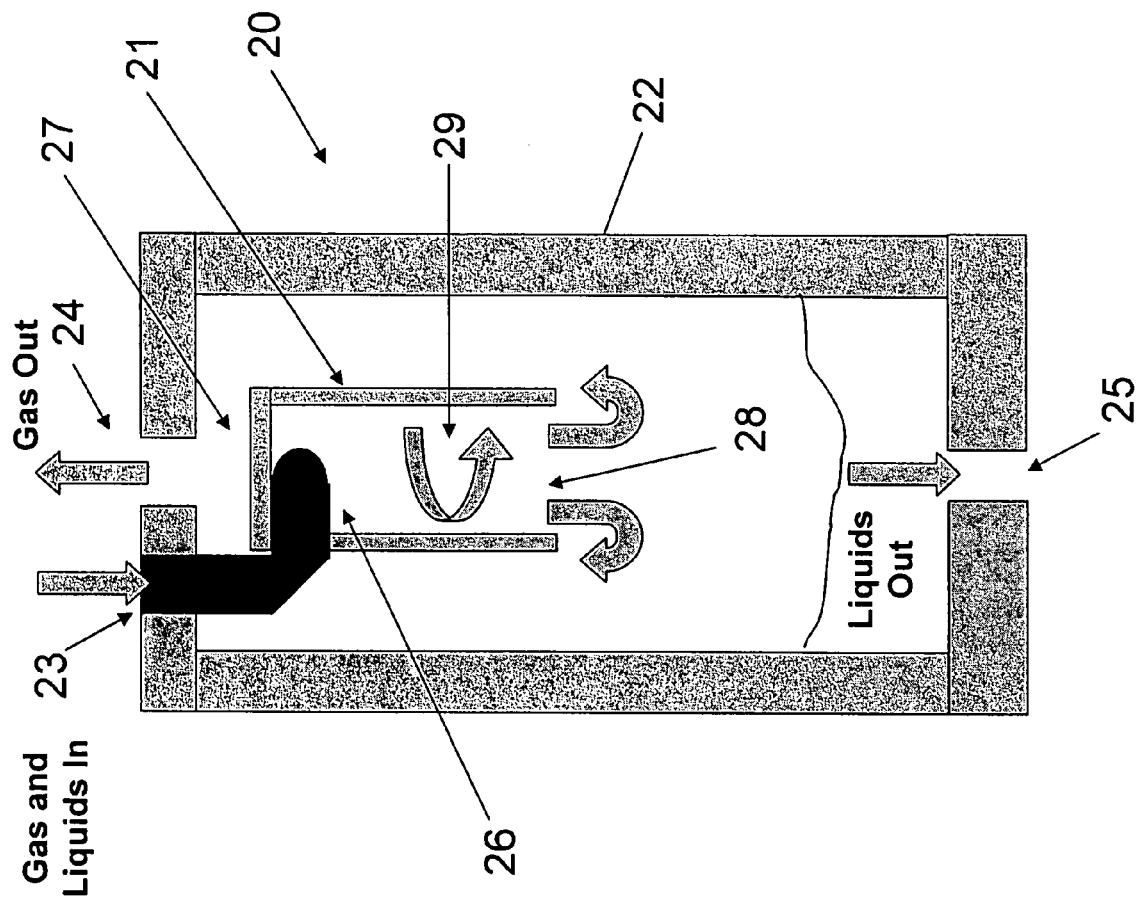
FIG. 2 is a cross-sectional view of a high-pressure separator according to the invention.

FIG. 2 is a diagram of a longitudinal cross-section of a high-pressure separation apparatus according to the invention. The apparatus is particularly suitable for separating a high-pressure mixture comprising a gas and liquid particles.

The term "high pressure" in connection with the separating apparatus refers to pressures between 2 and 500 atmospheres (about 2-50 MPa).

The apparatus comprises a gravity separator 20 for expanding and separating the mixture into a gas phase and a liquid phase, and a centrifugal separator 21 located inside of the gravity separator 20 for imparting a helical flow 29 to the mixture.

The gravity separator 20 comprises a generally vertical cylindrical shell 22, an opening 23 for an inlet for the gas/liquid mixture, a gas outlet 24 located in an upper portion of the cylindrical shell 22, and a liquid outlet 25 located in a lower portion of the cylindrical shell 22. Preferably, the gas outlet 24 is located in the upper quadrant or top of the cylindrical shell 22, and the liquid outlet 25 is located at the bottom of the shell 22.

The centrifugal separator 21 comprises an inlet 26 for the mixture, which is located in an upper portion of the centrifugal separator 21, an enclosed upper portion 27 except for the inlet 26, and an outlet 28 for the mixture located at a lower portion of the centrifugal separator 21. Preferably, the outlet 28 is located at the bottom of the centrifugal separator 21.

In operation, the gas/liquid mixture enters the shell 22 of the gravity separator 20 and is directed to the internal centrifugal separator 21 through inlet 26. The internal centrifugal separator 21 is closed at the top 27 and open-ended at the bottom 28 so that the gas and coalesced liquid discharge from the bottom of the centrifugal separator 21.

By "closed" or "enclosed," it is meant that the upper portion 27 of the centrifugal separator 21 does not have a pipe providing a fluid communication between the inside of the centrifugal separator 21 and the outside of the gravity separator, except for the gas/liquid mixture inlet 26. Preferably, the upper portion 27 of the centrifugal separator 21 is also not in fluid communication with a pressure-sensitive safety device, such as a rupturable disc.

The centrifugal separator 21 causes the liquid particles in the incoming gas/liquid mixture to coalesce into larger droplets or into a liquid pool within the centrifugal separator 21 prior to discharge into the gravity separator 20. This dual separator design has improved efficiency over prior separation devices. The design reduces the entrainment of liquids in the gas stream 24 leaving the separator 20, thereby reducing fouling of downstream equipment and, in many cases, improving process yields, reducing cleaning and maintenance time and costs, improving on-stream factors, and increasing operating rates.

In the embodiment shown, the centrifugal separator 21 has a tangential side inlet 26 for imparting a helical flow 29 to the incoming the gas/liquid mixture. Alternatively or in addition to the tangential side inlet, the centrifugal separator 21 may contain one or more guide vanes, spinner plates, or paddles (not shown) anywhere along the length of the centrifugal separator 21, but typically in an upper portion thereof, to impart the incoming gas/liquid mixture with a helical flow 29.

In the embodiment shown, the centrifugal separator 21 does not touch the inside surface of the gravity separator 20, and is desirably located substantially in the axial center of the gravity separator 20. The centrifugal separator 21 may be suspended inside the gravity separator 20 in various ways such as by using vertical and/or horizontal supports (not shown) which attach the top and/or sides of the centrifugal separator to the inside surface of the gravity separator 20.

Also desirably, the centrifugal separator 21 is composed of a single cylinder. In other words, it does not have an inner cylinder to define an annular space within the centrifugal separator 21.

In one embodiment, not shown, the inlet 26 to the centrifugal separator 21 for the gas/liquid mixture extends outside of the gravity separator 20 through opening 23 in the gravity separator shell 22. The inlet 26 can be a conduit or pipe optionally equipped with a nozzle (not shown) to direct the flow of the gas/liquid mixture.

In another embodiment, not shown, the gravity separator 20 comprises one or more guide vanes, spinner plates, or paddles near the outlet 28 of the centrifugal separator 21 to impart a helical flow to the mixture exiting the centrifugal separator 21.

In yet another embodiment, not shown, the centrifugal separator 21 comprises vanes in a lower portion thereof for straightening the flow of the gas/liquid mixture as it exits the centrifugal separator 21.

As will be readily appreciated by persons skilled in the art, the relative dimensions of the gravity and centrifugal separators as well as the size of the inlet and outlet lines will depend on the requirements of the process to which the invention is applied. Naturally, pressures, temperatures, velocities, and differences in the densities and viscosities of the gas and liquid components will have to be taken into account. Generally speaking, the internal centrifugal separator 21 should be large enough to achieve a well-defined helical flow, instead of a chaotic flow, while not so large as to create an unacceptable updraft in the annular cross-section between the external and internal separation vessels. The internal diameter of the centrifugal separator 21 may be 0.05 to 0.8 times the internal diameter of the gravity separator 20. The length of the centrifugal separator 21 may be 0.1 to 0.8 times the length of the gravity separator 20, or may be up to four times its diameter. The inlet line 26 diameter should be chosen to achieve velocities in the typical range of 0.01 to 10 m/s, or 0.01 to 2 m/s. The inlet nozzle (not shown) may be located less than one diameter of the centrifugal separator 21 from the top of the centrifugal separator 21. The straightening vanes, if any, at the bottom of the centrifugal separator 21 may be less than one diameter of the centrifugal separator 21 in height.

The high-pressure separator of the present invention can be used to separate liquids from gases in numerous two-phase gas/liquid systems. It is particularly suitable for use in the synthesis of low-density polyethylene (LDPE) under high pressure. Thus, in other aspects, the invention provides both an apparatus and a method for making LDPE.

The apparatus for making LDPE comprises:
(a) a reactor for polymerizing ethylene at a pressure of 500 to 3,000 atmospheres (about 50-300 MPa) and a temperature of 160 to 350° C.;
(b) a pressure reducing device for reducing the pressure of a product stream from the reactor; and
(c) a high-pressure separation apparatus according to the present invention for separating liquid polyethylene particles and gaseous ethylene in the product stream.

The method for making LDPE comprises the steps of:
(a) polymerizing ethylene in a reactor at a pressure of 500 to 3,000 atmospheres (about 50-300 MPa) and a temperature of 160 to 350° C., typically in the presence of an initiator;
(b) passing a product stream comprising liquid polyethylene particles and gaseous ethylene from the reactor to a pressure reducing device to reduce the pressure of the product stream; and
(c) passing the product stream from the pressure reducing device to a high-pressure separation apparatus according to the present invention to separate the liquid polyethylene particles from the gaseous ethylene.

The reactor may be any of those known in the art for preparing LDPE under high pressure such as a stirred, autoclave reactor. The pressure reducing device may be one or more expansion valves. The pressure reducing device should be effective to reduce the pressure of the product stream coming out of the reactor, which ranges from 500 to 3,000 atmospheres (about 50-300 MPa), to the operating pressure of the high-pressure separator, which is on the order of 50 to 500 atmospheres (about 5-50 MPa).

The velocity of the LDPE product stream entering the high-pressure separator of the invention can vary over a wide range. Typically, the velocity can be from 0.01 to 2 m/s.

The polymerization reaction is typically initiated by atmospheric oxygen, peroxides, another free-radical initiator known in the art, or mixtures thereof. The amount of the initiator used can vary, depending on such factors as the efficiency of the initiator as well as the desired reaction temperature and production rate.

The ethylene can also be copolymerized with comonomers such as vinyl acetate, vinyl esters, olefinically unsaturated carboxylic acids, or α-olefins, such as propylene, 1-butene, 1-hexene, and 1-octene.

The polymerization may be carried out in the presence of modifiers such as hydrogen and/or hydrocarbon diluents such as ethane, propane, or butane. As such, the product stream entering the high-pressure separator may also contain the various modifiers and/or diluents.

The invention has been described in detail with particular reference to preferred embodiments thereof, but it will be understood that variations and modifications can be effected within the spirit and scope of the invention.

We claim:

1. An apparatus for separating a high-pressure mixture comprising a gas and liquid particles, said apparatus comprising:
    (a) a gravity separator for expanding and separating said mixture into a gas phase and a liquid phase, said gravity separator comprising a vertical cylindrical shell, an opening for an inlet for said mixture, a gas outlet located in an upper portion of the cylindrical shell, and a liquid outlet located in a lower portion of the cylindrical shell; and
    (b) a centrifugal separator located inside of said gravity separator for imparting a helical flow to said mixture, said centrifugal separator comprising an inlet for said mixture located in an upper portion of the centrifugal separator, an enclosed upper portion except for the inlet, and an outlet for said mixture located at a lower portion of the centrifugal separator.

2. The apparatus according to claim 1, wherein the centrifugal separator inlet for said mixture is a tangential side inlet.

3. The apparatus according to claim 1, wherein said centrifugal separator comprises guide vanes, spinner plates, or paddles in an upper portion thereof for imparting said helical flow.

4. The apparatus according to claim 1, wherein said gravity separator comprises guide vanes, spinner plates, or paddles near the outlet of the centrifugal separator for imparting helical flow to the mixture exiting the centrifugal separator.

5. The apparatus according to claim 1, wherein said centrifugal separator comprises vanes in a lower portion thereof for straightening the flow of the mixture.

6. The apparatus according to claim 1, wherein the centrifugal separator does not touch the inside surface of the gravity separator.

7. The apparatus according to claim 1, wherein the centrifugal separator does not comprise an inner cylinder to define an annular space therebetween.

8. The apparatus according to claim 1, wherein the upper portion of the centrifugal separator is not in fluid communication with a pressure-sensitive safety device.

9. The apparatus according to claim 1, wherein the inlet in the centrifugal separator for said mixture extends outside of the gravity separator through said opening.

10. A method for separating a high-pressure mixture comprising a gas and liquid particles, comprising:
    (a) introducing said mixture into the apparatus according to claim 1;
    (b) separating said mixture into a gas phase and a liquid phase;
    (c) withdrawing said gas phase out of the gravity separator through the gas outlet located in an upper portion of the cylindrical shell; and
    (d) withdrawing said liquid phase out of the gravity separator through the liquid outlet located in a lower portion of the cylindrical shell.

11. An apparatus for preparing low-density polyethylene comprising:
    (a) a reactor for polymerizing ethylene at a pressure of 500 to 3,000 atmospheres and a temperature of 160 to 350° C.;
    (b) a pressure reducing device for reducing the pressure of a product stream from the reactor; and
    (c) a high-pressure separation apparatus according to claim 1 for separating liquid polyethylene particles and gaseous ethylene in the product stream.

12. A method for making low-density polyethylene comprising:
    (a) polymerizing ethylene in a reactor at a pressure of 500 to 3,000 atmospheres and a temperature of 160 to 350° C.;
    (b) passing a product stream comprising liquid polyethylene particles and gaseous ethylene from the reactor to a pressure reducing device to reduce the pressure of the product stream; and
    (c) passing the product stream from the pressure reducing device to a high-pressure separation apparatus according to claim 1 to separate said liquid polyethylene particles from said gaseous ethylene.

* * * * *